United States Patent
Togo et al.

(10) Patent No.: US 8,894,135 B2
(45) Date of Patent: Nov. 25, 2014

(54) FLOOR ARRANGEMENT OF DRIVER'S SECTION OF VEHICLE

(71) Applicant: Kubota Corporation, Osaka-shi (JP)

(72) Inventors: Manabu Togo, Sakai (JP); Koji Masumoto, Sakai (JP); Ryuji Kitagawa, Sakai (JP); Norihide Iwata, Sakai (JP); Kengo Satoh, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/775,685

(22) Filed: Feb. 25, 2013

(65) Prior Publication Data

US 2014/0062139 A1    Mar. 6, 2014

(30) Foreign Application Priority Data

May 18, 2012 (JP) .................................. 2012-114779

(51) Int. Cl.
*B62D 21/17*    (2006.01)
*B62D 25/20*    (2006.01)

(52) U.S. Cl.
CPC ...................................... *B62D 25/20* (2013.01)
USPC ........................ 296/208; 296/39.3; 296/97.23

(58) Field of Classification Search
CPC .. B62D 21/17; B60R 13/0846; B60R 13/083; B60N 3/04; B60N 3/048
USPC ...................................... 296/208, 39.3, 97.23
See application file for complete search history.

(56) References Cited

U.S. PATENT DOCUMENTS

| | | | | |
|---|---|---|---|---|
| 3,078,116 | A * | 2/1963 | West ............................. | 296/208 |
| 3,630,564 | A * | 12/1971 | Ferrara ......................... | 296/208 |
| 4,898,419 | A * | 2/1990 | Kenmochi et al. ........... | 296/204 |
| 5,876,090 | A * | 3/1999 | Kawaguti ...................... | 296/208 |
| 6,383,599 | B1 * | 5/2002 | Bell et al. ...................... | 296/208 |
| 6,537,641 | B1 * | 3/2003 | Kroll ............................. | 296/208 |
| 2005/0161981 | A1 * | 7/2005 | Chernoff et al. ......... | 296/193.07 |
| 2007/0122594 | A1 * | 5/2007 | Kosar ............................ | 428/174 |
| 2008/0197661 | A1 * | 8/2008 | Wozniak .................... | 296/97.23 |

FOREIGN PATENT DOCUMENTS

| | | | | | |
|---|---|---|---|---|---|
| JP | 406156322 | A * | 6/1994 | ................... | 296/208 |
| JP | 710038 | A | 1/1995 | | |
| JP | 710040 | A | 1/1995 | | |
| JP | 8332976 | A | 12/1996 | | |

* cited by examiner

*Primary Examiner* — Jason S Morrow
(74) *Attorney, Agent, or Firm* — The Webb Law Firm

(57) ABSTRACT

A floor arrangement of a driver's section of a vehicle includes a floor frame, an acoustic absorbent placed on the floor frame and a floor mat placed on the acoustic absorbent. A wire harness is placed in an acoustic absorbent-free space formed between the floor frame and the floor mat. A protector is provided inside the acoustic absorbent-free space in the vicinity of the wire harness and extends upward from the floor frame. This protector is affixed to the floor frame and configured to receive a load applied to the floor harness from the upper side thereof.

10 Claims, 5 Drawing Sheets

FLOOR ARRANGEMENT OF DRIVER'S SECTION OF VEHICLE

BACKGROUND OF THE INVENTION

1. Field of the Invention

The present invention relates to a floor arrangement of a driver's section of a vehicle in which a wire harness is placed.

2. Description of the Related Art

A floor arrangement of a tractor as an example of vehicle is known from e.g. the Japanese Unexamined Patent Application Publication No. 8-332976. In this arrangement, acoustic absorbent is provided for preventing transmission of noise generated from an engine, a transmission, etc. disposed under the driver's section to a driver's residential space. This acoustic absorbent is separated into two segments along the front/rear direction of the vehicle body and the wire harness is placed in a space created between the front and rear acoustic absorbent segments spaced apart from each other. And, the portion where the wire harness is placed and the front and rear acoustic absorbent segments are covered by a floor mat.

With the above-described floor arrangement, since the wire harness is placed in a space created between the front and rear separated acoustic absorbent segments, there occurs no such inconvenience that the floor map is deformed convex with a curve at the portion where the wire harness is present. However, when a driver gets on/off, if he/she may inadvertently step on the portion where the wire harness is present, the acoustic absorbent can be deformed by the weight of the driver, thus applying or transmitting this driver's weight to the wire harness directly. Obviously, repeated application of such load on the wire harness is undesirable.

Accordingly, there is a need for a floor arrangement with which application of load to the wire harness placed in the floor arrangement of the driver's section is less likely.

SUMMARY OF THE INVENTION

A floor arrangement of a driver's section of a vehicle according to the present invention comprises: a floor frame; an acoustic absorbent placed on the floor frame; a floor mat placed on the acoustic absorbent; a wire harness placed in an acoustic absorbent-free space (an acoustic absorbent-separation gap) formed between the floor frame and the floor mat. Here, the term: acoustic absorbent-free space, refers to a channel or passage delimited by the absorbent, the floor mat and the floor frame. A protector extends inside the acoustic absorbent-free space (the passage described above) in the vicinity of the wire harness and extending upward from the floor frame. Further this protector is affixed to the floor frame and configured to receive a load applied to the floor harness from the upper side thereof.

With the above-described arrangement, the protector for wire protection extending vertically from the floor frame is disposed on the lateral sides of the wire harness. Further, the acoustic absorbent surrounds the arrangement except for the upper side of the area where the protector and the wire harness are present. And the upper sides of the protector and the harness are covered with the floor mat. Therefore, even if a passenger when getting on/off may step on the portion where the wire harness is located and applies a load thereto, this load is received by the protector mounted erect and extending vertically from the floor frame. As a result, even with repeated application of such load in association with passenger's getting on/off actions, this will not give any damage to the wire harness.

Further, since the protector is disposed on the lateral sides of the wire harness and mounted erect on the floor frame, this protector does not block access to the wire harness from the upper side thereof. Namely, removing the floor mat will open up the upper side of the wire harness. Therefore, when an assembly operation of assembling the wire harness or a maintenance operation for repair or replacement thereof is to be carried out, there is no component interfering with this operation, so that the assembly, replacement, etc. of the wire harness can be carried out easily. Further, at the time of installment of the wire harness, the protector can serve as a "reference" or a "guide" for the installing position. So, occurrence of error in the installment position can be restricted.

The acoustic absorbent-free space as a "channel" delimited by the acoustic absorbent, the floor mat and the floor frame can be readily formed by disposing two acoustic absorbents with a gap therebetween. In this, advantageously, the acoustic absorbent-free space has a rectangular cross section.

As some preferred non-limiting examples of the cross sectional shape of the protector, there can be cited a vertically elongate rectangle (i.e. the protector is formed like a simple flat plate. Here, this will be referred to as "I-shaped" cross section), an L-shape, a U-shape, etc. In any one of these cases, the lower end thereof is affixed to the floor frame, advantageously. In particular, in the case of a protector having a shape formed by disposing two I-shapes side by side or the U-shape, the protector per se or constituent members of the protector will be located on the both sides of the area where the wire harness is present. Hence, even if a passenger steps on the portion where the wire harness is present to apply a load thereto, this load can be received in a reliable manner by the protector on the both sides of the wire harness.

According to one preferred embodiment of the present invention, a gap is formed between the upper end of the protector and the floor mat. Under the floor frame, a vibration generating source such as an engine may sometimes be present. Then, if a gap is formed between the protector extending vertically from the floor frame and the floor mat, even if vibration is applied to the floor frame, this vibration can be damped by the gap progressively from the protector toward the floor mat. Accordingly, the above arrangement restricts transmission of vibration to the foot of the driver placed on the floor mat, thus preventing deterioration in riding comfort.

As one particular floor arrangement proposed by the present invention, a getting on/off passageway is formed between a handle post mounted erect at a front portion of the driver's section and a driver's seat provided at a rear portion of the driver's section; and the protector extends from the lower end of the handle post toward one lateral portion of the driver's seat such that the protector is located more on the center side in the vehicle width direction on the front side of the vehicle body and the protector is located more on the outer side in the vehicle width direction on the rear side of the vehicle body. With this arrangement, a driver who gets on/off the vehicle via the getting on/off passageway formed from the laterally outer side of the driver's section and the driver's seat will get on/off in the direction intersecting the extending direction of the protector. That is, as the driver getting on/off via the getting on/off passageway will walk in the direction intersecting the extending direction of the protector, the possibility of this driver's stepping on the wire harness installed portion is low.

If the protector has a height greater than the vertical width of the wire harness, even if the wire harness installed portion is stepped on, the load thereto can almost surely be received by the protector completely.

DETAILED DESCRIPTION OF THE PREFERRED EMBODIMENTS

Next, preferred embodiments of a floor arrangement relating to the present invention will be described with reference to the accompanying drawings, in which the invention is applied to a tractor as an example of a vehicle.

General Construction of Tractor

Figure 1:
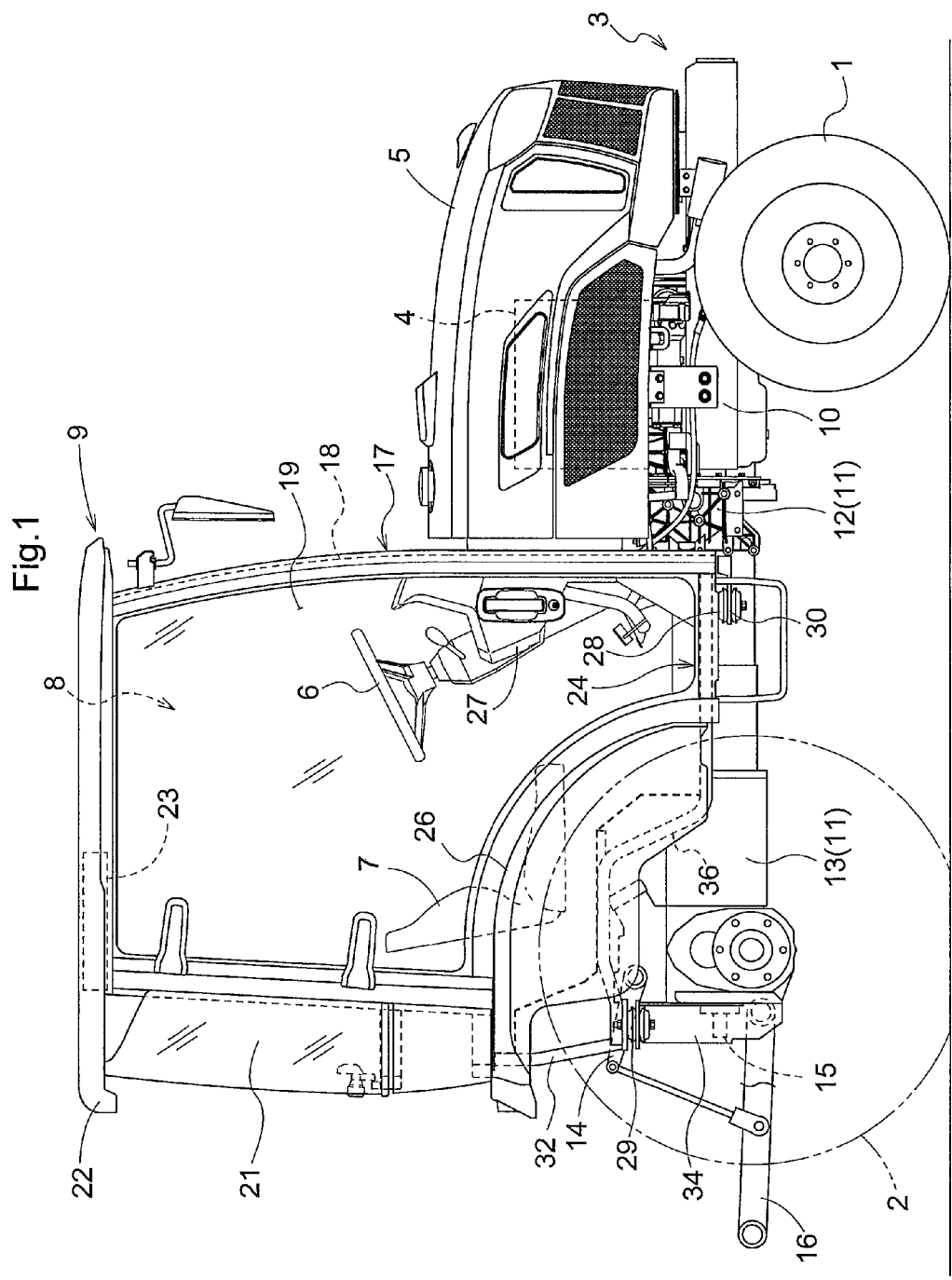
FIG. 1 is an overall side view of a tractor.

As shown in FIG. 1, the tractor is a four-wheel drive type comprising a traveling vehicle body 3 including a pair of left and right steerable and drivable front wheels 1 and a pair of left and right drivable rear wheels 2. At a front portion of the traveling vehicle body 3, there is provided a hood portion 5 housing an engine 4, etc. therein, and at a rear portion of the traveling vehicle body 3, there is provided a driver's section 8 having a steering wheel 6, a driver's seat 7, etc. The driver's section 8 is covered by a cabin 9.

A front machine body frame 10 extends from the lower side of the engine 4 towards the front side of the vehicle body and a rear machine body frame 11 extends from the engine 4 toward the rear side of the vehicle body. The front machine body frame 10 supports front axle cases (not shown) for mounting the front wheels 1, etc.

The rear machine body frame 11 comprises a clutch housing 12 which extends from the engine 4 toward the rear side of the vehicle body and a transmission case 13 connected to a rear portion of the clutch housing 12. The transmission case 13 disposed under the engine 4 is connected to the clutch housing 12. Power from the engine 4 is transmitted via the clutch housing 12 and the transmission case 13 to the rear wheels 2.

At the rear portion of the transmission case 13, there are provided a pair of left and right lift arms 14 and a power takeoff (PTO) shaft 15. A utility implement (not shown) such as a rotary cultivator or the like is connected to the rear portion of the transmission case 13 via a link mechanism 16 so that the implement can be lifted up/down. The lift arms 14 and the link mechanism 16 are operably coupled with each other; and as the implement is operably coupled with the PTO shaft 15, a rotational power is transmitted to this implement.

Construction of Cabin

Figure 2:
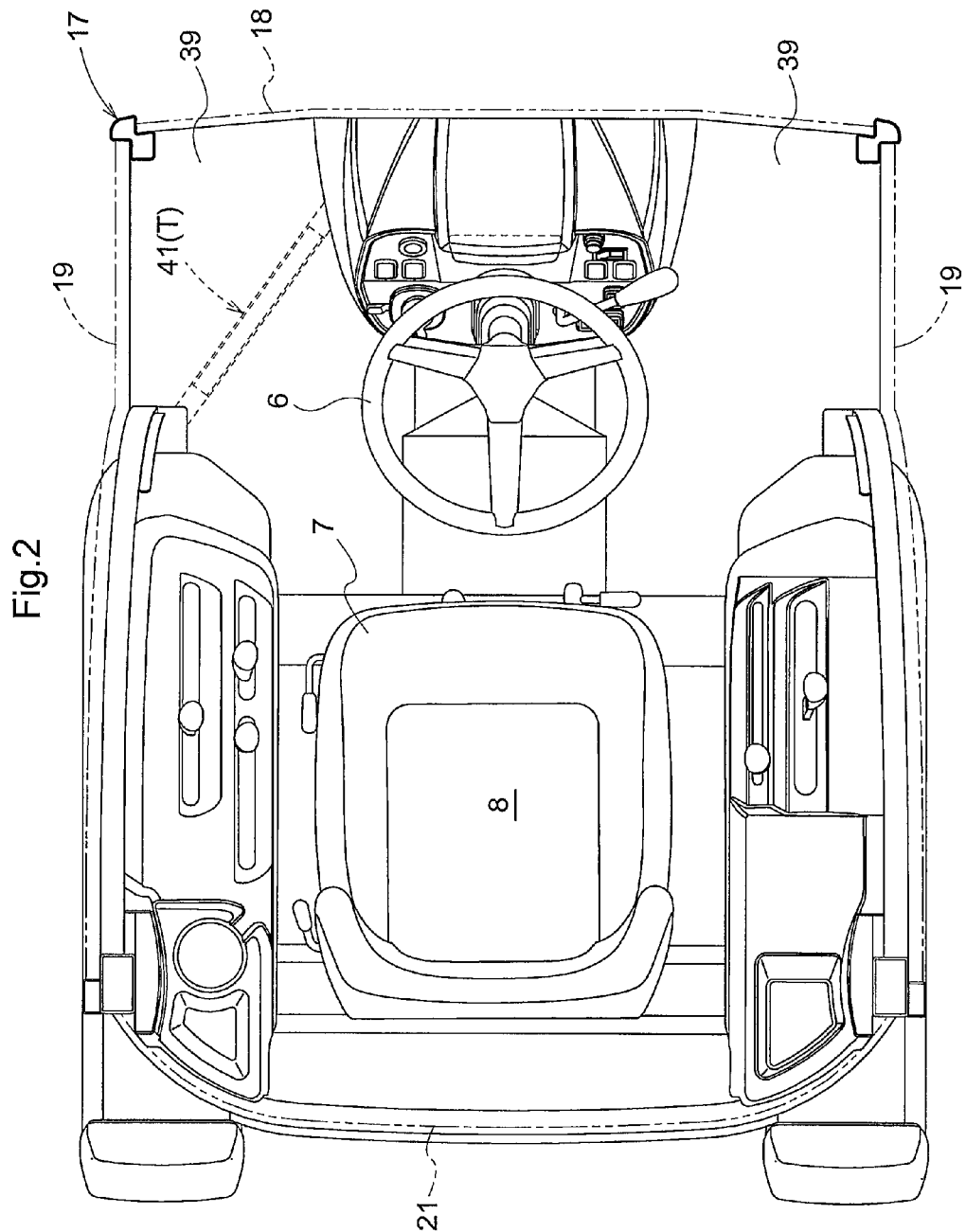
FIG. 2 is a plane view of a driver's section.

As shown in FIG. 1 and FIG. 2, the cabin 9 includes a cabin frame 17 supporting the entire cabin 9, a front windshield glass 18 covering the front face of the cabin frame 17, pivotally opened/closed doors 19 provided on the opposed lateral sides of the cabin frame 17, a rear shielding glass 21 covering the rear face of the cabin frame 17, and so on. The upper side of the cabin 9 is covered with a ceiling unit 22, and this ceiling unit 22 is provided as a hollow construction in which an air conditioner 23 is accommodated.

Figure 4:
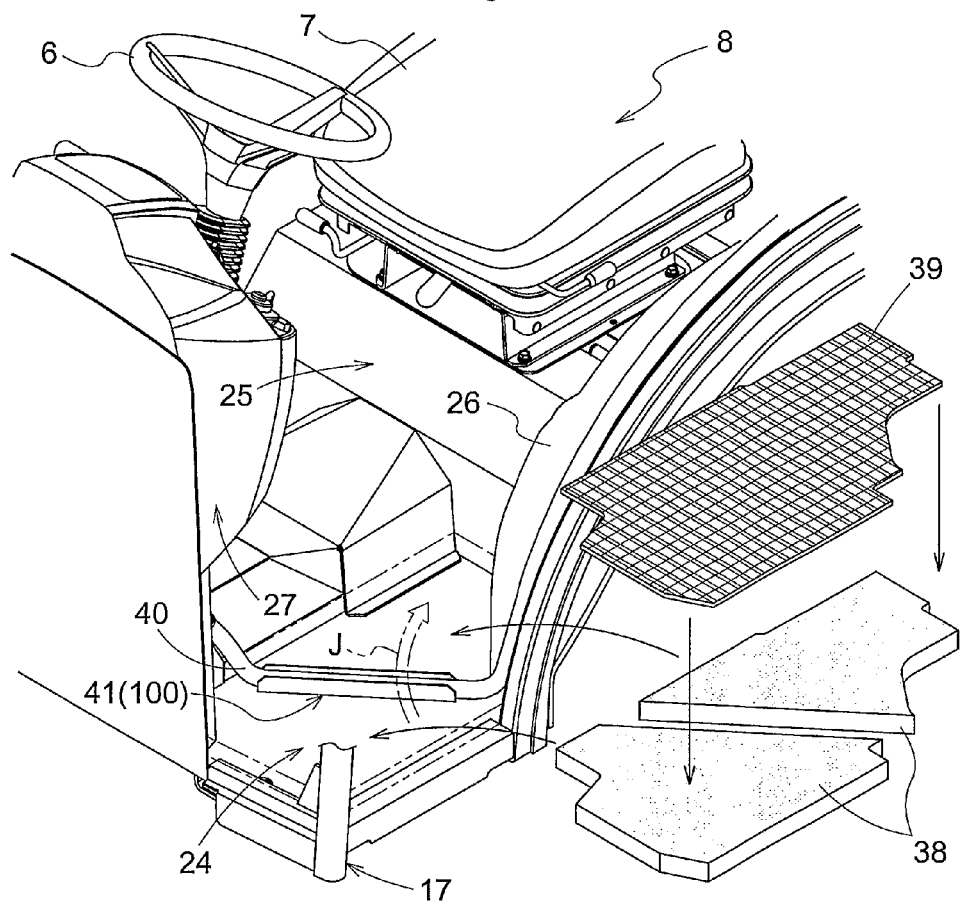
FIG. 4 is a perspective view of the driver's section.

As shown in FIG. 4, to the lower side of the cabin frame 17, there are affixed floor frame 24 for supporting the floor of the driver's section 8. To the rear portion of the cabin frame 17, there are affixed a seat frame (seat panel body) 25 which supports the driver's seat 7 and rear wheel fenders 26 disposed on the left and right sides. At a front portion of the cabin frame 17, there is mounted a handle post 27 having the steering wheel 6, etc.

The cabin 9 constructed as described above is supported to the rear machine body frame 11 via vibration-isolating rubbers 28, 29 which are provided respectively at the left and right sides at the front and rear opposed sides.

As shown in FIG. 1, a front bracket 30 supporting a front portion of the cabin 9 is provided at and extends from each of the left and right sides of the clutch housing 12, so that the front lower end portions of the cabin frame 17 are supported by the front brackets 30 via the vibration-isolating rubbers 28.

Figure 3:
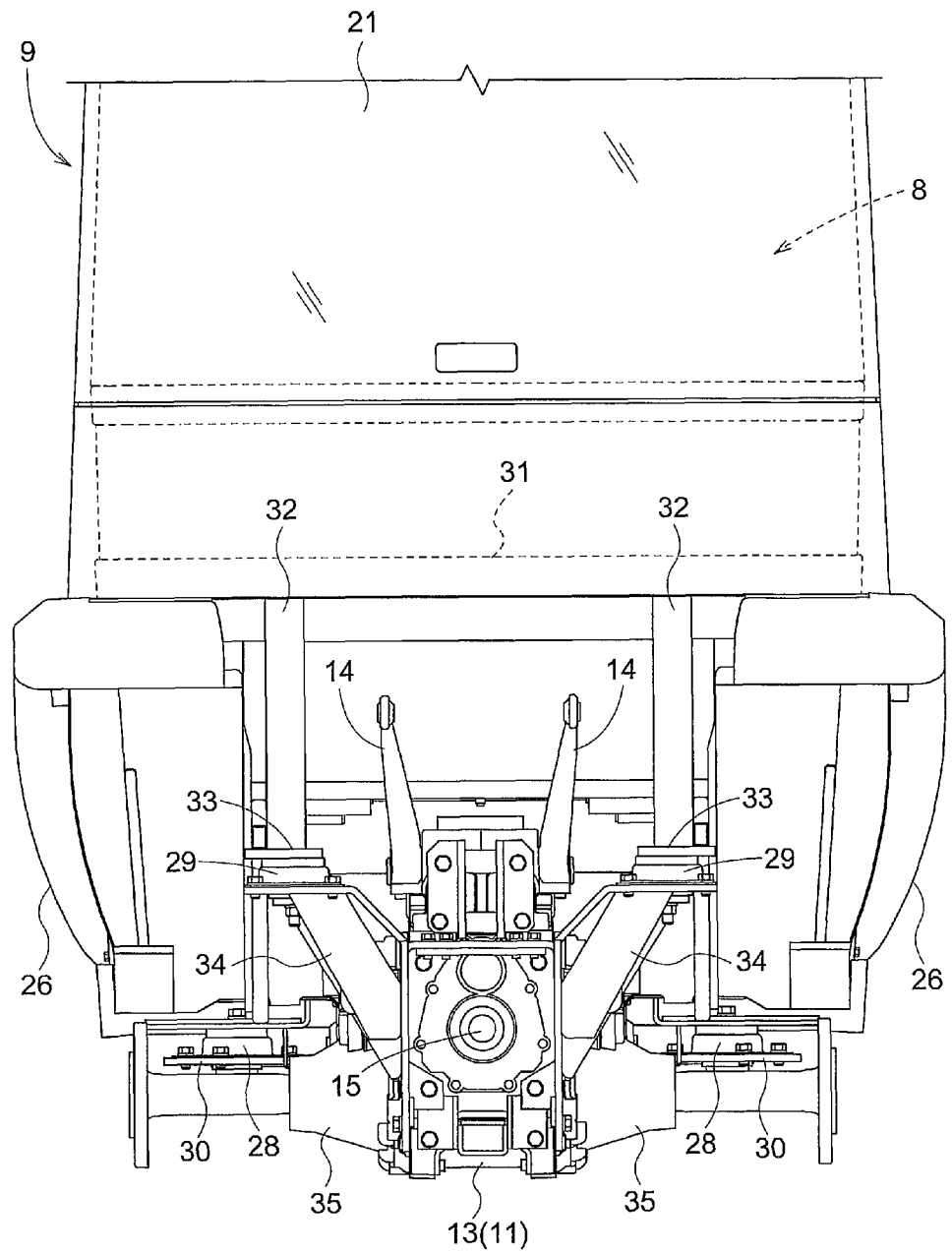
FIG. 3 is a rear view of the tractor.

As shown in FIG. 3, on the rear side of the cabin 9, a pair of left and right vertically oriented support frames 32 extend downwards from a rear transverse frame 31 of the cabin frame 17. And, a mounting support portion 33 provided at the lower end of the vertically oriented support frame 32 is supported to a rear bracket 34 via the vibration-isolating rubber 29. This rear bracket 34 is fixed to each one of rear axle cases 25 and the position of the vibration-isolating rubber 29 is set as a low position substantially same as the height of the lift arm 14.

As shown in FIG. 1, from the lower ends of the pair of left and right vertically oriented support frames 32 toward the front side of the vehicle body, there is integrally formed and extended a front/rear reinforcing frame 36, and the front end portion of this front/rear reinforcing frame 36 is fixedly connected to the lower faces of the floor frames 24 on the left and right opposite sides. Namely, the vertically oriented support frames 32 are connected with the front/rear reinforcing frame 36 and the cabin frame 17 in a loop form as a whole so as to provide enhanced supporting strength.

Floor Arrangement of Driver's Section

Figure 5:
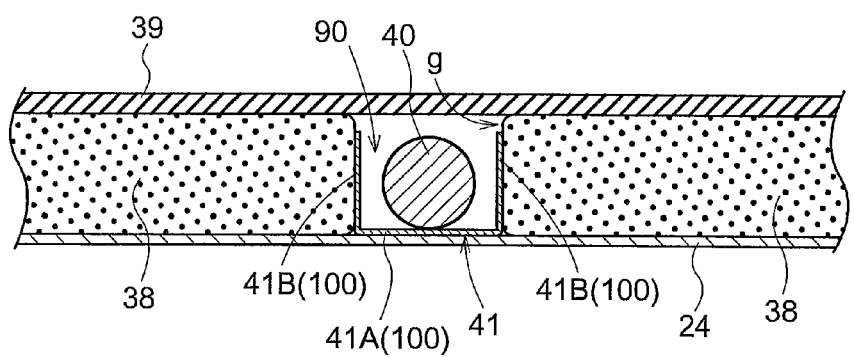
FIG. 5 is a vertical section of a wire harness installed portion.

As shown in FIG. 4 and FIG. 5, on the floor frame 24 supporting the floor of the driver's section 8, there is placed a floor mat 39 via an acoustic absorbent 38; and between the floor mat 39 and the floor frame 24, a wire harness 40 is provided.

This wire harness 40 includes wires for connecting an unillustrated power unit provided in the vehicle body with the air conditioner 23 provided in the ceiling unit 22 of the cabin 6, connecting wires for a seat switch (not shown) for detecting a driver's seated state at the driver's seat 7, etc. and a bundle of these wires are covered with a cover member.

Along the extending direction of the wire harness 40 and adjacent this wire harness 40, a protector 100 extends for protecting the wire harness. This protector 100 is affixed to the floor frame 24 and extends vertically from the floor frame 24. The protector 100 is formed on each of the opposed sides of the area where the wire harness 40 is present.

In the instant embodiment, as shown in FIG. 4, the protector 100 is provided as a protecting channel member 41 having an approximately U-shaped cross section. The protecting channel member 41 consists of a bottom plate portion 41A fixedly welded to the floor frame 24 and projecting plate portions 41B which respectively extend upwards from the left and right ends of the bottom plate portion 41A.

As shown in FIG. 5, the wire harness 40 is accommodated within the groove of the protecting channel member 41, that is, the space delimited by the left and right opposed projecting plate portions 41B and the bottom plate portion 41A. On the floor frame 24, there is placed the acoustic absorbent 38 made of a sponge material or the like having an acoustic absorbing function (acoustic isolating function). But, at the portion where the wire harness 40 is placed, this acoustic absorbent 38 is not present, and in this "vacant" area 90, the protecting channel member 41 is provided. And, on and over the acoustic absorbent including this vacant space, there is placed the floor mat 39 formed of e.g. a rubber. That is, the vacant area 90 is a passageway delimited by the floor frame 24, the floor mat 39 and the acoustic absorbent 38. Therefore, this channel (vacant area) can be called an "acoustic absorbent free space" or an "acoustic absorbent separation space". In the instant embodiment, the cross section of the acoustic absorbent free space 90 has a rectangular shape; and the upper side or face thereof is delimited by the floor mat 24, the opposed lateral sides thereof are delimited by the acoustic absorbent 38, and the bottom side thereof is delimited at least partially by the floor frame 24.

In the instant embodiment, as shown in FIG. 5, the height of the left and right opposed projecting plate portions 41B of the protecting channel member 41 is set greater than the vertical width of the wire harness 40. Further, between the upper end of each of the left and right projecting plate portion 41B and the floor mat 39, there is formed a gap (g) having a predetermined width along the vertical direction.

And, as shown in FIG. 2 and FIG. 4, the protecting channel member 41 extends from the lower end of the handle post 27 toward one lateral portion of the driver's seat 7 in such a manner that the protecting channel member 41 is located more on the center side in the vehicle width direction on the front side of the vehicle body and the protector is located more on the outer side in the vehicle width direction on the rear side of the vehicle body.

A passenger or a driver will open the door 19 of the cabin 9 and get on/off via a getting on/off portion 42 formed at a lateral end of the floor of the driver's section 8. After getting into the driver's section 8 via the getting on/off portion 42, the passenger will pass a getting on/off passageway J formed between the handle post 27 and the driver's seat 7 and move toward the driver's seat 7. In this, the driver moves in a direction intersecting the extending direction of the protecting channel member 41. Also, when the passenger or driver gets off the vehicle, he/she moves in the direction opposite thereto.

Accordingly, the walking direction of the driver or passenger extends along the direction intersecting the extending direction of the protecting channel member 41. As a result, even if the passenger should place his/her foot on a position upwardly of the wire harness 40, its weight will be received reliably by the opposed projecting plate portions 41B of the protecting channel member 41, whereby application of load to the wire harness 40 can be avoided.

Figure 6:
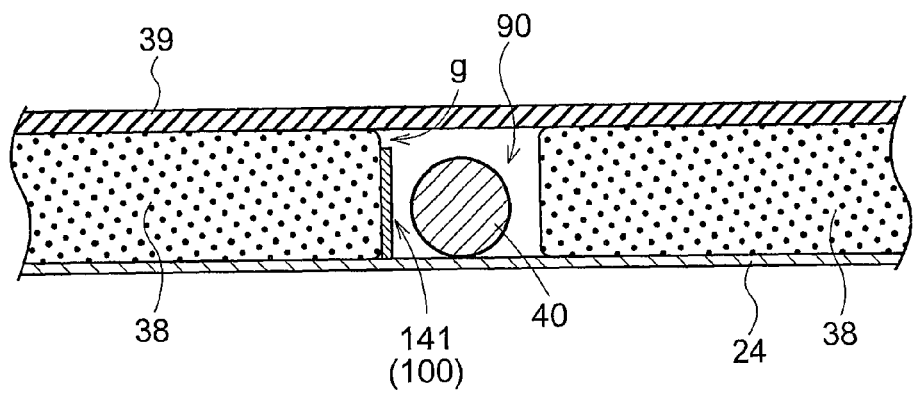
FIG. 6 is a vertical section of a wire harness installed portion according to a further embodiment.

Other Embodiments (1) As a further embodiment, the protector 100, as shown in FIG. 6, may be comprised of a flat plate 141 mounted erect on the floor frame 24. In this arrangement too, a rectangular shape is preferred as the cross sectional shape of the acoustic absorbent free space (the channel for the wire harness 40), and the back face of the flat plate 141 is in contact with the acoustic absorbent 38. Also, a gap (g) is formed between the upper end of the flat plate 141 and the floor mat 39. By setting the plate width of the flat plate 14 such that the upper end of this flat plate 141 may be positioned higher than the wire harness 40, a load applied from upper side of the wire harness 40 via the floor mat 39 can be received sufficiently.

Figure 7:
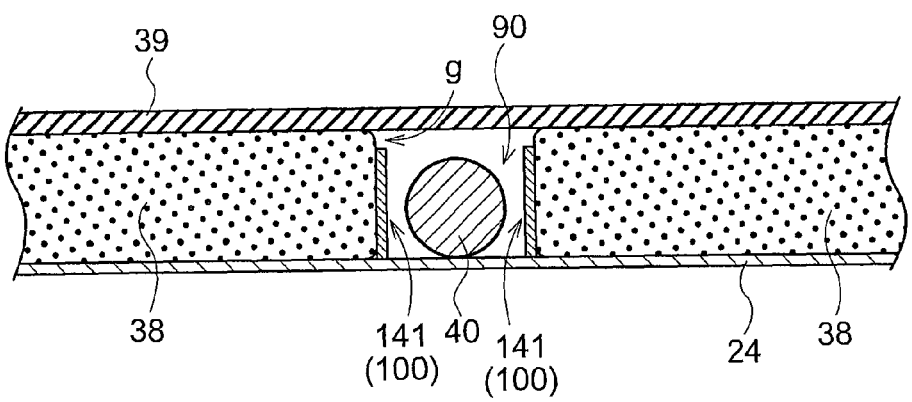
FIG. 7 is a vertical section of a wire harness installed portion according to a still further embodiment.

(2) In the foregoing embodiment, the left and right opposed projecting plate portions 41B of the protecting channel member 41 constitute the protector 100. Instead of this, in a still further embodiment of the present invention, for instance, as shown in FIG. 6, the protector 100 may be formed only at one lateral portion of the wire harness 40. Or, further alternatively, as shown in FIG. 7, the protector 100 may be comprised of two flat plates 141 mounted erect on the floor frame 24. In this case, the wire harness 40 will be positioned between the two flat plates 141. This embodiment is realized by omitting the bottom plate portion 41A of the protecting channel member 41 in the foregoing embodiment, and the flat plates 141 will be fixed to the floor frame 24 by means of welding or the like.

(3) In the foregoing embodiment, between the upper end of the protector 100 (the projecting plate portion 41B of the protecting channel member 41) and the floor mat 39, the gap (g) having a predetermined width is formed to extend vertically. Instead of this, the invention may adopt an arrangement wherein no such gap (g) is formed between the upper end of the protector 100 and the floor mat 39.

(3) In the foregoing embodiment, on the upper side of the protector 100 and the area where the wire harness 40 is present (the acoustic absorbent free space 90), the acoustic absorbent 38 is not present. Instead of this, a covering absorbent different from the acoustic absorbent 38 which is detachable and configured to cover the acoustic absorbent free space, may be provided. In this case, after removable of the floor mat 39, if the covering absorbent is removed, the upper side of the wire harness 40 will be opened or exposed.

(4) In the foregoing embodiment, as shown in FIG. 4, the protector 100 is placed in such a manner that the protector is located more on the center side in the vehicle width direction on the front side of the vehicle body and the protector is located more on the outer side in the vehicle width direction on the rear side of the vehicle body. However, an arrangement of installing the protector along the front/rear direction of the vehicle body or a further arrangement of installing it along the vehicle body width direction too are not excluded from the scope of the present invention.

(5) In the foregoing embodiment, the protector 100 has a height greater than the height of the wire harness 40. Instead, the protector 100 may have a height substantially same as (or even slightly smaller than) the height of the wire harness 40.

(6) In the foregoing embodiment, a tractor was disclosed as an example of a vehicle. However, the floor arrangement of the present invention may be applied to any work vehicle other than a tractor such as a combine, a rice planter, etc.

The invention claimed is:

1. A floor arrangement of a driver's section of a vehicle, comprising:
   a floor frame;
   an acoustic absorbent placed on the floor frame;
   a floor mat placed on the acoustic absorbent;
   a wire harness placed in an acoustic absorbent-free space formed between the floor frame and the floor mat, the absorbent-free space being an upper-opened channel opened to the floor mat, an upper side of the absorbent-free space being delimited by the floor mat; and
   a protector extending inside the acoustic absorbent-free space in the vicinity of the wire harness and extending upward from the floor frame, the protector being affixed to the floor frame and configured to receive a load applied to the floor harness from the upper side thereof.

2. A floor arrangement according to claim 1, wherein the acoustic absorbent-free space has a rectangular cross section, its opposed lateral sides being delimited by the acoustic absorbent, its bottom side being delimited by the floor frame.

3. A floor arrangement according to claim 2, wherein the protector is a vertically mounted flat plate with its lower end being affixed to the floor frame.

4. A floor arrangement according to claim 3, wherein a gap is formed between the upper end of the protector and the floor mat.

5. A floor arrangement according to claim 3, wherein the protector is disposed on both lateral sides of the wire harness.

6. A floor arrangement according to claim 2, wherein the protector has a cross section consisting of a bottom plate portion affixed to the floor frame and at least one projecting plate portion extending vertically from the bottom plate portion.

7. A floor arrangement according to claim 6, wherein the protector has an L-shaped cross section.

8. A floor arrangement according to claim 7, wherein a gap is formed between the upper end of the protector and the floor mat.

9. A floor arrangement according to claim 6, wherein the protector has a U-shaped cross section.

10. A floor arrangement according to claim 9, wherein a gap is formed between the upper end of the protector and the floor mat.

\* \* \* \* \*